(No Model.) 2 Sheets—Sheet 1.
W. W. HAUPT.
WAGON.
No. 423,475. Patented Mar. 18, 1890.
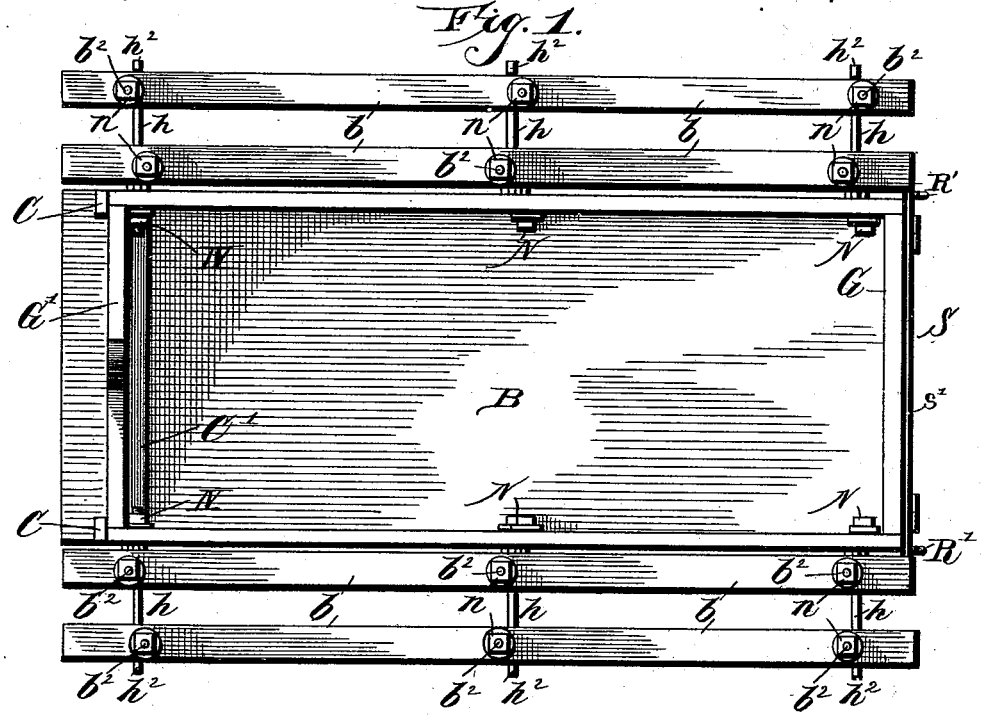
Fig. 1.
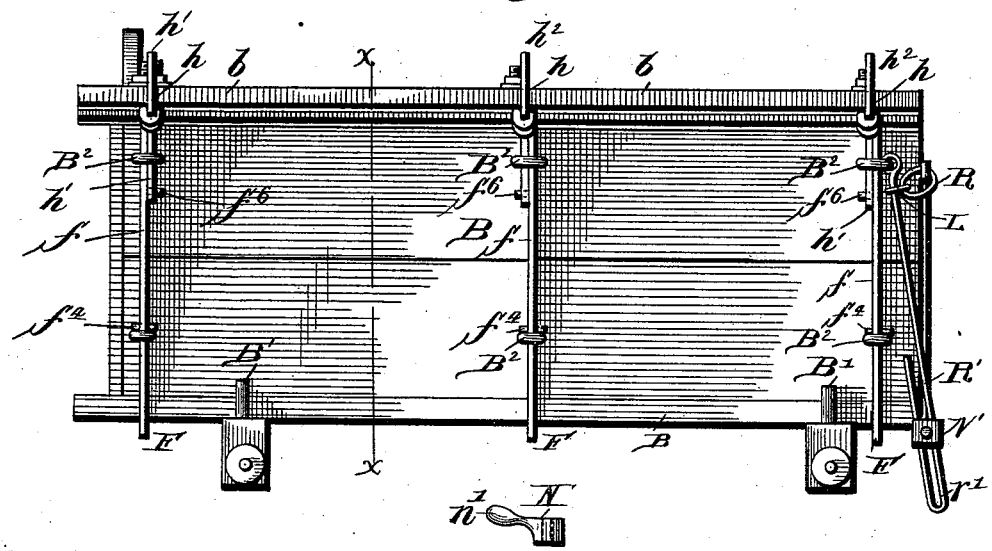
Fig. 2.
Fig. 3.
Witnesses:
Henry G. Dieterich
Thomson Cross
Inventor:
William W. Haupt,
per Henry Orr
Atty.
N. PETERS, Photo-Lithographer, Washington, D. C.

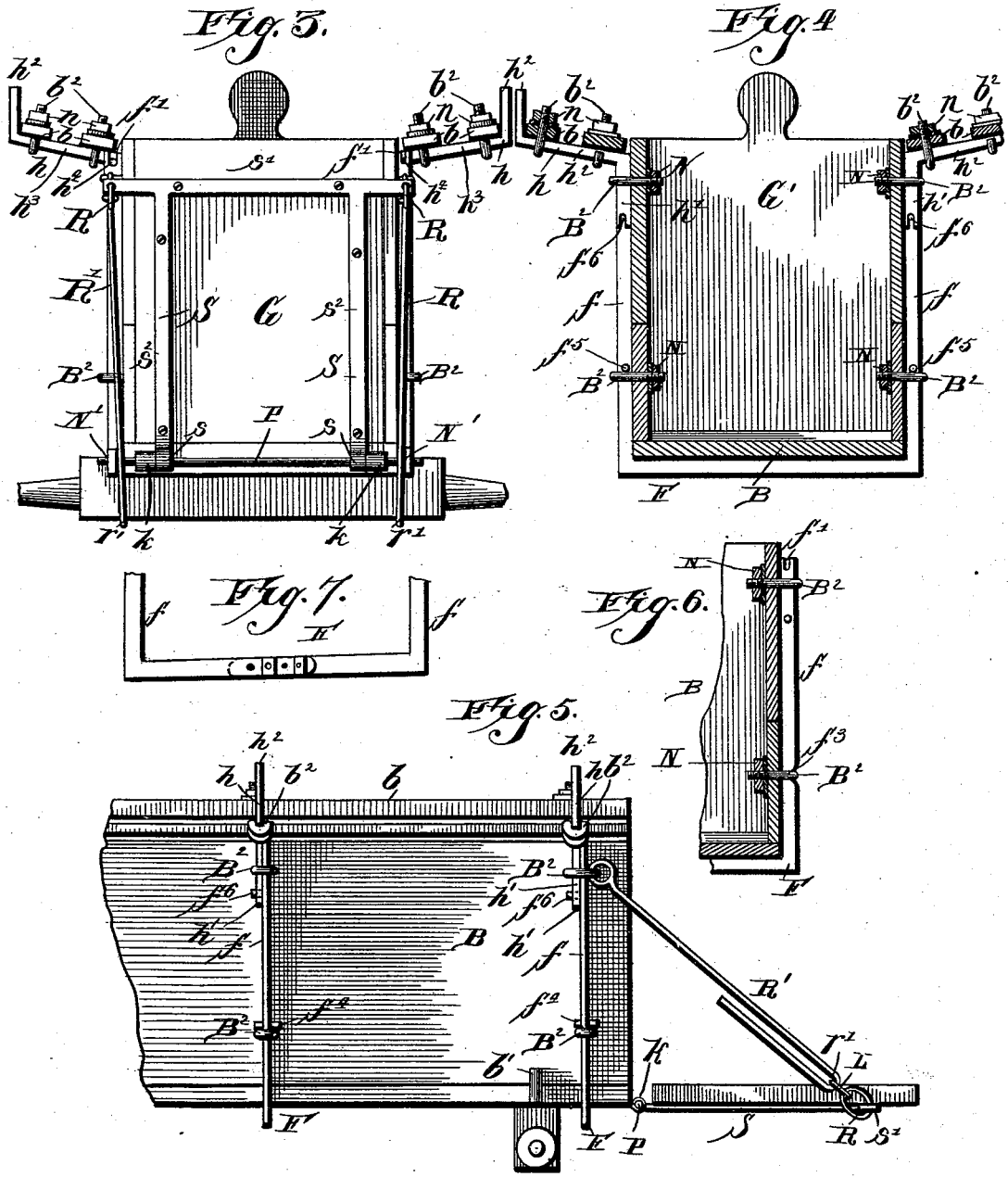

UNITED STATES PATENT OFFICE.

WILLIAM W. HAUPT, OF KYLE, TEXAS.

WAGON.

SPECIFICATION forming part of Letters Patent No. 423,475, dated March 18, 1890.

Application filed November 30, 1889. Serial No. 332,147. (No model.)

*To all whom it may concern:*

Be it known that I, WILLIAM W. HAUPT, a citizen of the United States, residing at Kyle, in the county of Hays and State of Texas, have invented certain new and useful Improvements in Wagons; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Referring to the drawings, Figure 1 is a top plan view, Fig. 2 a side elevation, Fig. 3 a rear end elevation, and Fig. 4 a section on or about on line $x\,x$ of Fig. 3, of a wagon bed or body provided with my improvements. Fig. 5 is a side elevation of the rear portion of the wagon bed or body, showing the end-gate down; and Figs. 6, 7, and 8 are detail views.

The invention relates to the construction of wagon beds or bodies; and it has for its object to provide a simple means for bracing such beds or bodies to prevent the sides thereof from spreading under a load, and whereby the heavy standards usually employed may be dispensed with.

The further object of the invention is to connect the braces detachably with the wagon bed or body and construct them for adjustment, so that they may be used in wagon beds or bodies of different width.

The further object of the invention is to provide a simple and efficient means for locking the end-gate of the wagon and for supporting the same on a level with the bottom of the wagon-bed, so as to form substantially an extension of such bottom.

The further object of the invention is to combine with the braces for the wagon body or bed a hay frame or rack and to connect the same detachably with said braces.

To these ends the invention consists in the means employed for bracing the wagon body or bed, and in the combination therewith of a hay-frame, in the means for locking the end-gate of the wagon and for holding the same on a level with the floor of the wagon body or bed, and in the combination therewith of a vertically-sliding removable front gate, substantially as hereinafter described.

The wagon body or bed B is or may be constructed in any well-known or preferred manner, and its sides may be formed by two or more longitudinal boards, one or more of which may be made removable. The body or bed is held to the bolsters by small standards B', projecting from said bolsters sufficiently to maintain said body or bed B in proper position, the usual high standards being done away with.

The wagon-body is braced by U-shaped brace frames or irons F, of which I have shown three, and in practice this number will be found sufficient. These brace-irons are made of comparatively light iron—such as flat bar-iron—and encompass the floor and sides of the wagon-body. The vertical arms $f$ of the brace-irons extend nearly to the upper edge of the top boards of the wagon-body and have a longitudinal slot or recess $f^2$ in their upper end. The brace-irons F are secured to the side-boards of the wagon-body by means of hook-bolts $B^2$ and nuts N, and to prevent them from slipping in the hook-bolts the vertical arms $f$ thereof may be provided with a notch or notches $f^3$, one for each hook-bolt $B^2$, (see Fig. 6;) or studs or pins $f^4$, Figs. 2, 4, and 5, formed on or secured to the said vertical arms may be employed so as to hold the brace-irons F in position. It will be seen that by means of these brace-irons F the wagon-body is thoroughly braced against spreading. Near its upper end, below the upper hook or eye bolt $B^2$, each of the vertical arms $f$ of the braces F is provided with a pin or stud $f^6$, by means of which and the longitudinal slot or recess $f'$ and the upper hook-bolts $B^2$ the hay rack or frame is secured. This hay rack or frame consists of supports $h$ for the outriggers or longitudinal boards $b$, made of comparatively light flat bar-iron and having two vertical arms $h'\,h^2$ projecting at right angles in opposite directions from a web $h^3$, that is preferably slightly inclined. To these angle-iron supports are bolted the outriggers or longitudinal boards $b$ by means of hook-bolts $b^2$ and nuts $n$, so as to admit of their ready removal or adjustment. The legs or vertical arms $h'$ of the angle-iron supports $h$ have a notch or slot formed in their ends, into which fits the pin or lug $f^6$ on the vertical arms $f$ of the brace-irons F. (See Fig. 4.) The said angle-iron supports are also provided with a stud or pin $h^4$, (see Fig. 3,) that fits into the slot or recess $f'$ in the upper end of said vertical arms of the brace-irons, said pin or stud $h^4$ being located about at the angle formed by said vertical arms $h$ and the horizontal arm $h^3$ of the angle-iron supports. The upper hook-bolts $b^2$ have the eye formed of such diameter as to admit of the introduction of the leg or vertical arm $h'$ of the angle-irons $h$, and when so inserted the pins $f^6$ on the brace-irons F will lie in the notches or recesses in the end of the legs $h'$ of the angle-iron supports of the hay frame or rack, while the pins $h^4$ on said supports will lie in the notches or recesses $f'$ in the upper end of the vertical arms or standards of the brace-irons F. A firm bearing is thus provided for the hay frame or rack, and the said frame may be readily applied or removed.

The brace-irons F may be made adjustable, so as to fit wagon-bodies of different width, by constructing them of two right-angular sections, the horizontal arms of which are connected by a pivot bolt and nut or by two such bolts and nuts, and one or both of said arms may be provided with a plurality of bolt-holes, as shown in Fig. 7, so as to admit of the adjustment referred to. The brace-irons may thus be removed when no load is carried in the wagon and folded or disconnected, taking up but little room.

The front end of the wagon body or bed B is closed by a sliding gate G', held in position and guided in its movements by cleats C C, secured to the ends of the side-boards by a cleat C', secured to the floor of the wagon-body, and by the nuts N on the hook-bolts B², as clearly shown in Fig. 1.

The rear end-gate G is provided with a hinge-strap S, the hinge-knuckles $s$ being formed in the lower end of the vertical limbs $s^2$ of said strap, the hinge-pintle P being of such length as to project some distance beyond the sides of the gate and passes through said knuckles and through knuckles $k$, secured to the floor of the wagon-body, the projecting ends of the pintle P being screw-threaded for the reception of a locking-nut N'. The horizontal limb or branch $s'$ of the hinge-strap S' also projects slightly beyond the sides of the gate, and has an eye formed in said projecting ends, into which is passed a ring R, connected by a link L with a locking rod or bar R', whose outer end is bent into U shape. The rod or bar is connected to the eye or hook of the upper bolt B² of the rear brace-iron F, and when the gate is closed, as shown in Fig. 2, the bent end $r'$ of the rod R' is passed over the hinge-pintle P and held in position by means of the nut N', thus locking the gate securely to the wagon-body. By removing the nuts N' at each end of the hinge-pintle P and disengaging the locking rods or bars R' from said pintle the gate G can be lowered, the link L sliding down along the rod to the bend $r'$, which forms a bearing for said link to support the gate on or about on a level with the floor of the wagon-body, as shown in Fig. 5.

To avoid the use of a wrench for the removal of the nuts N' from the hinge-pintle P for the purpose of lowering the gate, nuts N', provided with a handle $n'$, Fig. 8, may be employed, or any other desired means by which the rods R' are held on the hinge-pintle P when the gate is closed may be employed.

Although I have described the hay frame or rack constructed to be supported from the brace-irons F, it will be readily understood that the wagon body or bed may be provided with other suitable bearings for the legs $h'$ of said frame or rack, so as to connect the same therewith for temporary use or whenever required. It is further obvious that the rods R' for locking and supporting the end-gate may be employed on any wagon-body by providing suitable means for securing said rods to said wagon-body, and that the means hereinabove described are simply a convenience. The hook-bolts that serve to hold the brace-irons also serve as a bearing for the rods R'.

Having described my invention, what I claim, and desire to secure by Letters Patent, is—

1. The combination, with a wagon body or bed, of brace-irons encompassing the floor and sides of said body, said brace-irons being adjustable as to width to fit wagon-bodies of different width, as set forth.

2. The combination, with a wagon body or bed, of brace-irons adapted to encompass the sides and bottom of said body or bed and constructed of two L-shaped sections, the horizontal arms whereof are arranged to overlap, and an adjustable connection for connecting said arms to adapt the brace-irons for application to wagons of different width, substantially as described.

3. The combination, with a wagon body or bed and bearings connected with the side-boards thereof, of brace-irons adapted to encompass the sides and bottom of said body or bed and constructed of two L-shaped sections, the vertical arms whereof extend through the bearings connected with the side-boards, while the horizontal arms are arranged to overlap, a locking device to lock the vertical arms to their bearings, and an adjustable locking device for locking together the horizontal arms, substantially as and for the purposes specified.

4. The combination, with a wagon body or bed, brace-irons encompassing the floor and sides of said body and provided with a bearing at the upper end of the vertical arms or standards thereof, a pin or stud projecting laterally from the said standards below said bearing, and a hook-bolt for the brace-irons secured to the wagon-body between the bearing and stud, of a hay frame or rack consisting of angle-irons and outriggers or longitudinal boards secured thereto, said angle-irons having a bearing in the end of the leg thereof for the reception of the stud or pin on the brace-irons, and a like stud or pin fitting into the bearing in the end of the standards of the brace-irons, said leg of the hay-frame passing through the hook or eye of the bolt, as described.

5. The combination, with a wagon body or bed, of brace-irons encompassing the sides and bottom of said body or bed and constructed of flat bar-iron in two sections bent at right angles, so as to set on edge around said wagon body or bed, an adjustable connection for the horizontal arms of the sections, and a locking device for detachably locking the vertical arms thereof to the sides of the wagon body or bed, substantially as and for the purposes specified.

6. The combination, with a wagon body or bed, of brace-irons detachably connected with said body or bed and encompassing the sides and bottom thereof, bearings formed at the upper end of the vertical arms, a hay frame or rack adapted to be supported from said bearings, and a hook or eye bolt detachably connecting the frame or rack and brace-irons with the wagon body or bed, substantially as and for the purposes specified.

7. The combination, with a wagon body or bed and locking and supporting rods pivotally connected with said body, one on each side thereof, and having a bearing at their free end, of a drop-gate hinged to said wagon-body, the hinge-pintle of which projects beyond the sides of the gate and is adapted to engage the bearings at the rod ends, and a link-connection between the gate and the rods, substantially as and for the purpose specified.

8. The combination, with a wagon body or bed and locking and supporting rods pivotally connected with said body, one on each side thereof, and having bearings at their free end, of a drop-gate hinged to said wagon-body, the hinge-pintle of which projects beyond the sides of the gate and is adapted to engage the bearings at the rod ends, a link-connection between the gate and the rods, and a locking device to lock the rods against disengagement with the hinge-pintle, substantially as and for the purpose specified.

9. The combination, with a wagon body or bed and the locking and supporting rods pivotally connected with said body, one on each side thereof, and having a bearing at their free end, of a drop-gate hinged to the floor of said body, a hinge-strap provided with a horizontal branch the ends of which project beyond the sides of the gate, a hinge-pintle whose ends also project beyond the sides of the gate and are adapted to engage the bearings of the locking and supporting rods, a link-connection between the projecting ends of the hinge-strap and the said rods, and a locking device to lock the rods against disengagement with the hinge-pintle, substantially as and for the purpose specified.

10. The combination, with the wagon-body, the rear brace-iron F, the upper hook-bolts B², and the bent rod R′, connected with said hook-bolt, of the drop-gate G, its hinge-strap S, the branch s′ of which projects beyond the gate sides, the hinge-pintle P, extending also beyond the gate sides and having said projecting ends provided with a screw-thread, a link-connection between the branch s′ of the strap and the rod R′, and a nut N′, for locking the rod against disengagement from the hinge-pintle when the projecting end thereof lies in the bent end of the rod, substantially as and for the purpose specified.

In testimony whereof I affix my signature in presence of two witnesses.

WM. W. HAUPT.

Witnesses:
F. D. TURNER,
J. N. WHISENONT.